United States Patent
Phairat et al.

(10) Patent No.: US 11,434,251 B2
(45) Date of Patent: Sep. 6, 2022

(54) MAGNESIUM COMPOUND, METHOD FOR PRODUCING THE SAME AND USE THEREOF

(71) Applicant: SCG Chemicals Co., Ltd., Bangkok (TH)

(72) Inventors: Phiriyawirut Phairat, Bangkok (TH); Wannaborn Mingkwan, Bangkok (TH); Chammingkwan Patchanee, Ishikawa (JP)

(73) Assignee: SCG Chemicals Co., Ltd., Bangkok (TH)

( * ) Notice: Subject to any disclaimer, the term of this patent is extended or adjusted under 35 U.S.C. 154(b) by 0 days.

(21) Appl. No.: 16/767,318

(22) PCT Filed: Oct. 29, 2018

(86) PCT No.: PCT/EP2018/079565
§ 371 (c)(1),
(2) Date: May 27, 2020

(87) PCT Pub. No.: WO2019/105667
PCT Pub. Date: Jun. 6, 2019

(65) Prior Publication Data
US 2021/0002302 A1   Jan. 7, 2021

(30) Foreign Application Priority Data
Nov. 28, 2017   (EP) .................................. 17204062

(51) Int. Cl.
C07F 3/02 (2006.01)
C08F 10/06 (2006.01)
(52) U.S. Cl.
CPC ................ C07F 3/02 (2013.01); C08F 10/06 (2013.01)

(58) Field of Classification Search
CPC ........... C07F 3/02; C08F 10/06; C08F 4/6548
See application file for complete search history.

(56) References Cited

U.S. PATENT DOCUMENTS

2020/0299422 A1*   9/2020   Kono ...................... C08F 4/654

FOREIGN PATENT DOCUMENTS

| CN | 101054424 A | 10/2007 |
| EP | 3459009 A2 | 12/1991 |

(Continued)

OTHER PUBLICATIONS

Hongmanee et al., "Probing into morphology evolution of magnesium ethoxide particles as precursor of Ziegler-Natta catalysts," Polyolefins J., vol. 3, No. 1 (2016) 47-57. (Year: 2016).*

(Continued)

Primary Examiner — Catherine S Branch
(74) Attorney, Agent, or Firm — Banner & Witcott, Ltd.

(57) ABSTRACT

The present invention relates to a method of producing a magnesium compound represented by the following formula: $Mg(OR^1)_{2-n}(Modifier)_n$ wherein $R^1$ is $C_mH_{2m+1}$, where in m is an integer from 2 to 10, and n is 0-2 wherein the method comprises the steps a) providing a mixture comprising magnesium, an initiator and a first alcohol wherein the molar ratio of initiator to magnesium is from 0.0001 to 1; and b) adding a modifier to the mixture obtained in step a) wherein the modifier is selected from the group consisting of alkoxy alcohol, carboxylic acid ester, aliphatic hydrocarbon, aromatic hydrocarbon, ketone, a second alcohol or a mixture thereof, wherein the second alcohol is different from the first alcohol, respective magnesium compound and the use thereof.

16 Claims, 1 Drawing Sheet

(56) References Cited

FOREIGN PATENT DOCUMENTS

| | | |
|---|---|---|
| EP | 1739070 A1 | 1/2007 |
| EP | 1783109 A1 | 5/2007 |
| EP | 2617739 A1 | 7/2013 |
| WO | 2006028736 A1 | 3/2006 |
| WO | WO-2017170077 A1 * 10/2017 ............. C07C 29/70 |

OTHER PUBLICATIONS

Jan. 21, 2019, International Search Report and Written Opinion, PCT/EP2018/079565.

* cited by examiner

MAGNESIUM COMPOUND, METHOD FOR PRODUCING THE SAME AND USE THEREOF

CROSS-REFERENCE TO RELATED APPLICATIONS

This application is a U.S. National Stage application under 35 U. S.C. § 371 of International Application PCT/EP2018/079565 (published as WO 2019/105667 A1), filed Oct. 29, 2018, which claims the benefit of priority to Application EP 17204062.8, filed Nov. 28, 2017. Benefit of the filing date of these prior applications is hereby claimed. Each of these prior applications is hereby incorporated by reference in its entirety.

TECHNICAL FIELD

The present invention relates to a magnesium compound, a method for preparing the same and use thereof as a solid pre-catalyst component for olefin polymerization.

BACKGROUND

High bulk density, regular shape and uniformity in particle size distribution are desirable properties for polymer resins to provide good flowability during resin extrusion, faster extrusion rates, easier handling and transportation advantages. These desirable properties of polymer resins are usually affected by the properties of a catalyst used for preparing the polymer resins, in particular by the properties of the solid catalyst as well as of the catalyst support.

Magnesium alkoxide has been widely used as a catalyst support for polymerization catalysts in particular Ziegler-Natta type catalysts and there are many studies to improve the properties of magnesium alkoxide.

U.S. Pat. No. 7,754,640B2 discloses a method of producing a magnesium composition by reacting metal magnesium, e ol, an alcohol having from 3 to 10 carbon atoms and halogen.

US2013/0196847A1 discloses a dialkoxy magnesium carrier prepared by the reflux reaction of magnesium, mixed alcohols and mixed halogenated agents in inert atmosphere.

WO 2005/044873 discloses a method for synthesizing spherical magnesium alkoxide particles by reacting magnesium with an alcohol mixture at a temperature below the boiling point of the mixture.

The spherical magnesium alkoxide particles synthesized by the methods are rather frangible and do not retain their morphology or particle size during the synthesis of Ziegler Natta procatalyst, especially when the procatalyst synthesis is carried out on a large scale. Further, the particle size distribution of the alkoxide particles synthesized by the above mentioned methods need improvement.

It is therefore an object of the present invention to provide a magnesium compound, a method for producing a magnesium compound and a solid pre-catalyst for olefin polymerization comprising the magnesium compound overcoming drawbacks of the prior art, in particular to provide a method of producing a .magnesium compound having high bulk density and an improved morphology, the method allowing control of the particle size and the size distribution.

DISCLOSURE OF THE INVENTION

The above object is achieved by a method of producing a ma a compound represented by the following formula:

$$Mg(OR^1)_{2-n}(Modifier)_n$$

wherein $R^1$ is $C_mH_{2m+1}$, wherein m is an integer from 2 to 10, and n is 0-2, preferably from greater than 0-2 wherein the method comprises the steps a) providing a mixture comprising magnesium, an initiator and a first alcohol wherein the molar ratio of initiator to magnesium is from 0.0001 to 1; and b) adding a modifier to the mixture obtained in step a) wherein the modifier is selected from the group consisting of alkoxy alcohol, carboxylic acid ester, aliphatic hydrocarbon, aromatic hydrocarbon, ketone, a second alcohol or a mixture thereof, wherein the second alcohol is different from the first alcohol.

In principle, the order of addition of magnesium, initiator and first alcohol for providing the mixture is not limited. It may first be provided a mixture comprising the initiator and the first alcohol to which the magnesium is added. Likewise, it might be provided that initiator, magnesium and first alcohol are mixed at the same time, for example by providing initiator and magnesium and exposing them to the first alcohol.

The term "carboxylic acid ester" as used herein refers to the reaction product of a carboxylic acid (R—COOH) and alcohol (R'—OH) i.e. an ester having the general formula R—C(O)OR'. An example of such a carboxylic ester is ethyl acetate.

The term "aliphatic hydrocarbon" as used herein encompasses hydrogencarbon compounds containing only carbon and hydrogen joined together in straight chains, branch chains or non-aromatic rings. Encompassed are aliphatic compounds which are saturated (i.e. do not comprise any double bonds) or unsaturated aliphatic compounds (i.e. compounds comprising one or more double bonds but not being aromatic).

The magnesium compound in terms of the present invention is particle shaped, i.e. consists of particles comprising, preferably consisting of, the material having the chemical formula $Mg(OR^1)_{2-n}Modifier)_n$.

In a preferred embodiment, the molar ratio of initiator to magnesium is from 0.0002 to 0.0048.

It is er preferred that the initiator is a halogen and/or a halogen containing compound.

The initiator may be iodine, bromine, chlorine or a mixture thereof, preferable iodine.

Furthermore, the initiator may be a compound containing a halogen atom such as iodine, bromine, chlorine. Examples are magnesium chloride ($MgCl_2$), magnesium iodine ($MgI_2$), magnesium ethoxide chloride (Mg(OEt)Cl, magnesium ethoxide iodine (Mg(OEt)I, magnesium bromide ($MgBr_2$), calcium chloride ($CaCl_2$), sodium chloride (NaCl), potassium bromide (KBr), or a mixture thereof. The use of halogenated initiators, in particular the use of mixed halogenated agents, is helpful to enlarge the particle size of the magnesium compound. Among the applied initiators, $I_2$ gave the best balance for the particle shape and size distribution.

In one embodiment, the step a) comprises adding the magnesium and/or first alcohol to a reaction mixture comprising the initiator and first alcohol portionwise. In this regard, the term "portionwise" refers to an addition in which the total amount of magnesium and first alcohol to be added is split into two or (preferably) more portions which are then added successively into the mixture obtained in step a). By adding the magnesium portionwise, bigger magnesium compound particles may be obtained.

In this regard, it may be preferred that the step a) comprises adding the magnesium and/or the first alcohol portionwise for 2-9 times with an interval time of 10-30 minutes.

In one embodiment, the molar ratio of the magnesium to the first alcohol in each portion to be added may be from 0.15:1 to 0.3:1, preferably is 0.23:1.

In preferred embodiment, the magnesium and the first alcohol are added separately in each portion.

The modifier may be added after addition of the first portion of the magnesium and/or the first alcohol.

In this regard, it may be preferred that the modifier is added after addition of the last portion of the magnesium metal and/or a first alcohol.

The addition of the modifier in an early stage leads to significant distortion of particle shape with lots of fine particles. It is possible to maintain a spherical particle shape of the magnesium compound when the modifier is added at least ten minutes after the last addition of magnesium and/or first alcohol.

In one embodiment, the modifier is added before or after addition of the last portion of the magnesium and/or the first alcohol. The modifier can be added after one-time addition of the magnesium and/or the first alcohol, between portionwise additions of the magnesium and/or the first alcohol or after addition of the last portion of the magnesium and/or the first alcohol.

In preferred embodiment, the step b) comprises adding the modifier 10-30 minutes addition of the last portion of the magnesium and/or the first alcohol and continuing the reaction, preferably for 1-4 hours.

In one embodiment, the modifier has relative polarity in a range of 0.0001 to 0.770.

The relative polarity is derived from Spectroscopic measurements as described in detail in Solvents and Solvent Effects in Organic Chemistry, Third Ed., Updated and Enlarged Edition, Christian Reichardt, WILEY-VCH, ISBN#3-527-30618-8, page 411-443.

In preferred embodiment, the modifier comprises from 3 to 10 carbon atoms in total.

Preferred examples of the modifier are alcohols such as methanol, 1-propanol, 2-propanol, 1-butanol, 2-butanol, iso-butanol, tert-butanol, ethylene glycol; alkoxy alcohol such as 2-methoxyethanol, 2-ethoxyethanol, 1-methoxy-2-propanol, 2-butoxyethanol, 2-phenoxyethanol, 3-methoxy-1-butanol; alkane such as heptane, decane, dodecane; aromatic hydrocarbon such as toluene, xylene, ethyl benzene; ester such as ethyl acetate; ketone such as 2-butanone; or mixtures thereof.

Particularly referred in this regard is that the modifier is selected from the group consisting of 1-propanol, iso-butanol, tert-butanol, 1-butanol, 2-propanol, 2-butanol, 1-decanol, phenol, 2-methoxyethanol, 2-butanone, ethylacetate, toluene, heptane or mixture thereof.

In one embodiment, the molar ratio of the modifier to the first alcohol is from 0.002:1 to 0.040:1.

In another embodiment, the molar ratio of the modifier to the magnesium is from 0.01:1 to 0.20:1.

In preferred embodiment, the first alcohol is ethanol.

In one embodiment, the temperature during all steps (step a) and step b)) is maintained below the boiling point of the first alcohol.

In a very preferred embodiment, the method of producing a magnesium compound comprises
a) contacting the first alcohol and the initiator at a temperature in the range of 70° C. to the boiling point of the first alcohol,
b) adding the magnesium and the first alcohol portionwise at a molar ratio of magnesium to first alcohol is from 0.15:1 to 0.3:1 and maintaining the reaction temperature in the range of 70° C. to the boiling point of the first alcohol,
c) adding the modifier after last addition of the magnesium metal and/or first alcohol,
d) stirring the solid obtained from step c) at temperature in the range of 70° C. to the boiling point of the first alcohol, and
d) separating the solid product out from liquid then drying the magnesium compound to obtain a morphologically modified magnesium compound.

The washing step may comprise washing the magnesium compound by heptane.

The drying step may comprise drying the magnesium compound under vacuum oven to obtain powder form of the morphologically modified magnesium compound.

The object is e achieved by a magnesium compound obtainable by the inventive method.

A magnesium compound obtainable by the inventive method as described above is solid and substantially magnesium alkoxide represented by the formula $Mg(OR_1)_{2-n}(Modifier)_n$. The magnesium compound is a morphologically modified magnesium compound.

The magnesium compound may have an average particle size ($D_{50}$) in a range of 25-65 micron, preferably 28 to 38 micron, a circularity in a range of 0.73-0.91 and a bulk density in a range of 0.30-0.45 g/ml.

The object is er achieved by a solid pre-catalyst for olefin polymerization comprising
a) the inventive magnesium compound,
b) a titanium compound represented by the following formula:

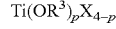

$Ti(OR^3)_pX_{4-p}$ where
$R^3$ are the same or different and represent hydrocarbyl group having from 1 to 10 carbon atoms,
X is a halogen atom, and
p is an integer from 0 to 4; and
c) an electron donating compound.

In a preferred embodiment, X is a chlorine atom or a bromine atom, more preferably is a chlorine atom.

Examples of the titanium compound include tetraalkoxy titanium such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, and tetraphenoxytitanium titanium tetrahalides such as titanium tetrachloride, titanium tetrabromide and titanium tetraiodide; alkoxytitanium trihalides such as methoxytitanium trichloride, ethoxytitanium trichloride propoxytitanium trichloride, n-butoxytitanium trichloride and ethoxytitanium tribromide; dialkoxytitanium dihalides such as dimethoxytitanium dichloride, diethoxytitanium dichloride, diisopropoxytitanium dichloride, di-n-propoxytitanium dichloride and diethoxytitanium dibromide; and tri-alkoxytitanium monohalides such as trimethoxytitanium chloride, triethoxytitanium chloride, triisopropoxytitanium chloride, tri-n-propoxytitanium chloride and tri-n-butoxytitanium chloride.

In another embodiment, the solid pre-catalyst further comprises electron donating compound. The electron donating compounds include oxygen-containing electron donors such as alcohols, phenols, ketones, aldehydes, carboxylic acids, malonic acids, succinic acid, esters of organic acids or inorganic acids and ethers such as monoether, diether and polyether, and nitrogen-containing electron donors such as ammonia, amine, nitrile and isocyanate. The esters of aromatic polycarboxylic acids are more preferred. Examples are di-n-butyl phthalate, diisobutyl phthalate, di-n-heptyl phthalate and diethyl phthalate and the like. These electron donating compounds may be used individually or as a combination of two or more compounds.

The object is further achieved by catalyst system for olefin polymerization comprising a) the inventive solid pre-catalyst,
b) an organoaluminum compound, and
c) optionally, an electron donating compound In one embodiment, the organoaluminum compound is an organoaluminum compound having an alkyl group, a halogen atom, a hydrogen atom and an alkoxy group, aluminoxane, or a mixture of these. Examples are trialkylaluminum compounds such as trimethylaluminum, triethylaluminum, triisopropylaluminum, triisobutylaluminum and trioctylaluminum; dialkylaluminum monochiorides such as diethylaluminum monochloride, diisopropylaluminum monochloride, diisobutylaluminum monochloride and dioctylaluminum monochloride; alkylalumlnum sesquihalides such as ethylaluminum sesquichloride; and linear aluminoxanes such as methylaluminoxane.

In another embodiment, the electron donating compound is organosilicon compounds having an alkoxy group, nitrogen-containing compounds, phosphorous-containing compounds and oxygen-containing compounds, preferable an organosilicon compound having an alkoxy group. Examples are trimethylmethoxysilane, trimethylethoxysilane, triethylmethoxysilane, triethylethoxysilane, dimethyldimethoxysilane, dimethyldiethoxysilane, ethylisopropyldimethoxysilane, propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, t-butylethyldimethoxysilane, t-butylpropyldimethoxysilane, t-butylisopropyldimethoxysilane, t-butylbutyldimethoxysilane, t-butylisobutyldimethoxysilane, t-butyls-butyl)dimethoxysilane, t-butylamyldimethoxysilane, t-butylhexyldimethoxysilane, t-butylheptyldimethoxysilane, t-butyloctyldimethoxysilane t-butylnonyldimethoxysilane, t-butyldecyldimethoxysilane, t-butyl(3,3,3-trifluromethylpropyl)dimethoxysilane, cyclohexylmethyldimethoxysilane, cyclohexylethyldimethoxysilane, cyclohexylpropyldimethoxysilane, cyclohexylisobutyldimethoxysilane, dicyclohexyldimethoxysilane, cyclohexyl-t-butyldimethoxysilane, cyclopentylmethyldimethoxysilane, cyclopentylethyldimethoxysilane, cyclopentylpropyldimethoxysilane, cyclopentyl-t-butyldimethoxysilane, dicyclopentyldimethoxysilane, cyclopentylcyclohex-idimethoxysilane, bis(2-methylcyclopentyl)dimethoxysilane, bis(2,3-dimethylcyclopentyl)dimethoxysilane, α-naphthyl -1,1,2-trimethylpropyldimethoxysilane, n-tetradecanyl-1,1,2-trimethylpropyldimethoxysilane, 1,1,2-trimethylpropylmethyldimethoxysilane, 1,1,2-trimethylpropylethyldimethoxysilane, 1,1,2-trirnethylpropylisopropyldimethoxysilane, 1,1,2-trimethylpropylcyclopentyldimethoxysilane, 1,2-trimethylpropylcyclohexyldimethoxysilane, 1,1,2-trimethylpropylimyristyldimethoxysilane, diphenyldimethoxysilane, diphenyldoethoxysilane, phenyltriethoxysilane, methyltrimethoxysilane, methyltriethoxysilane, ethyltrimethoxysilane, ethyltriethoxysilane propyltrimethoxysilane, isopropyltrimethoxysilane, butyitrimethoxysilane, butyltriethoxysilane, isobutyltrimethoxysilane, t-butyltaimethoxysilane s-butyltrlmethoxysilane, amyltrimethoxysilane, isoamyltrimethoxysilane, cyclopentyltrimethoxysilane, cyclohexyltrimethoxysilane, norbornanetrimethoxysilane, indenyltrimethoxysilane, 2-methylcyclopentyltrimethoxysilane, ethyltriisopropoxysilane, methylcyclopentyl(t-butoxy)dimethoxysilane, isopropyl(t-butoxy)dimethoxysilane, t-butyl(t-butoxy)dimethoxysilane, (isobutoxy)dimethoxysilane, vinyltriethoxysilane, vinyltributoxysilane, chlorotriethoxysilane, γ-chloropropyltrimethoxysilane, γ-aminopropyltriethoxysilane, 1,1,2-trilmethylpropyltrimethoxysilane, 1,1,2-trimethylpropylisopropoxydimethoxysilane, 1,1,2-trimethylpropyl(t-butoxy) dimethoxysilane, tetramethoxysilane, tetraethoxysilane, tetrabutoxysilane, tetraisobutoxysilane, ethyl silicate, butyl silicate, trimethylphe, noxysilane, methyltriallyloxysilane, vinyltris(μ-methoxyethoxy)silane, vinyltrisacetoxysilane and dimethyltetraethoxydisiloxane and the like. These organosilicon compounds may be used solely each, or two or more thereof may be used in combination.

Furthermore, the object is achieved by a process for preparing polypropylene homopolymer or polypropylene copolymer comprising contacting the inventive catalyst system with propylene monomers.

The object is further achieved by polypropylene homopolymer or polypropylene copolymer obtainable by the inventive catalyst system.

Furthermore, the object is achieved by a magnesium compound represented by the following formula:

$$Mg(OR^1)_{2-n}(Modifier)_n$$

where $R^1$ is $C_mH_{2m+1}$, where m is an integer of from 2 to 10; n is from 0.01-2; and modifier is selected from the group consisting of alkoxy alcohol, carboxylic acid ester, aliphatic hydrocarbon, aromatic hydrocarbon, ketone, an second alcohol or a mixture thereof, wherein the second alcohol is different from an alcohol having the formula $HOR^1$.

Surprisingly, it was found by the inventors that the method of the invention overcomes drawbacks of the prior art, in particular by allowing to prepare magnesium based compounds (=magnesium compound) having a particle shape with enhanced morphology and high bulk density and that the method of the invention allows to control the particle size of the inventive magnesium compound and the size distribution thereof.

Methods and definitions

1. Determination of $D_{10}$, $D_{50}$ and $D_{90}$ of magnesium compound and catalyst The particle characteristics are defined by $D_{10}$, $D_{50}$ and $D_{90}$ which are the cumulative number-based particle size at 10%, 50% and 90%, respectively. These values were acquired from SEM images en over 500 particles using image processing software.

2. Determination of relative sp. factor (RSF)

The relative span factor is calculated from the following equation.

$$RSF=(D_{90}-D_{10})/D_{50}$$

3. Determination of circularity

The circularity is calculated from the following equation.

$$Circularity\ degree=(4\times\pi\times area)/(boundary\ length)^2$$

4. Determination of bulk density

The bulk density of magnesium compound is determined by measuring a weight of a fixed volume according to JIS K 6721.

In the following, the invention will be described in greater detail with reference to specific examples without, however, intending to limit the scope of the application respectively. Reference will be made in this regard to the enclosed figues, wherein FIG. 1 is a SEM image of the inventive magnesium alkoxide according to Ex.1.

EXAMPLE

Example 1 (Ex.1)

(1) Preparation of Magnesium Compound

Figure 1:
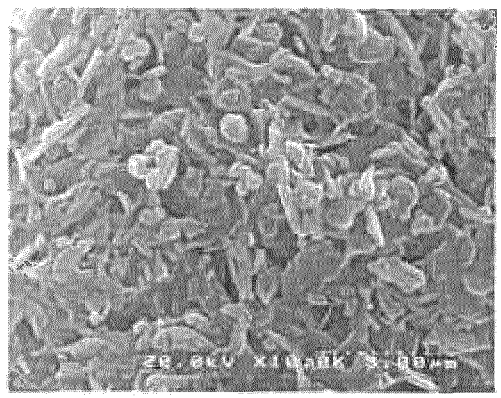

A three-necked flask having an internal volume of 500 ml and having a stirrer was flushed with nitrogen. 31.7 ml (0.543 mole) of ethanol and 0.68 g (0.0054 gram atom) of iodine were added into the three-necked flask and maintained a contact temperature at 75° C. and 180 rpm for 10 minutes. 3 g (0.123 gram atom) of magnesium metal and 31.7 ml (0.543 mole) of e of were added into the three-necked flask at 75° C. for 9 times (in 9 portions) with the interval time of 10 minutes. After 10 minutes of last addition of magnesium metal and ethanol, 5 mol % of 2-methoxy-ethanol based on the number of moles of magnesium were added into the three-necked flask and reaction was continued at 75° C. and 180 rpm for 2 hours. After the completion of the reaction, the resultant product was washed 3 times with 100 ml of n-heptane for each wash at room temperature. The washed product is dried under vacuum to obtain magnesium compound in powder form.

(2) Preparation of Solid Pre-Catalyst

A three-necked flask having an internal volume of 500 ml and equipped with a stirrer was flushed with nitrogen. 15 g of the magnesium compound obtained in (1) and 150 ml of toluene were added into the three-necked flask and cooled from room temperature to 0° C. 30 ml of $TiCl_4$ was added into the three-necked flask and heated to 90° C. 4.5 ml of dibutyl phthalate (DBP) were added, heated to 110° C. and stirred for 2 hours. The mixture was washed with 150 ml of toluene at 90° C. for 2 times. 150 ml of toluene and 30 ml of $TiCl_4$ were added, heated to 110° C. and stirred for 2 hours. The mixture was washed with 220 ml of heptane at 70° C. for 3 times then washed with 220 ml of heptane at room temperature for 4 times. The solid pre-catalyst of $TiCl_4/DBP/MgCl_2$ was obtained.

COMPARATIVE EXAMPLE 1 (Com. Ex. 1)

(1) Preparation of Magnesium Compound

A three-necked flask having an internal volume of 500 ml and having a stirrer was flushed with nitrogen. 31.7 ml (0.543 mole) of ethanol and 0.68 g (0.0054 gram atom) of iodine were added into the three-necked flask and maintained a contact temperature at 75° C. and 180 rpm for 10 minutes. 3 g (0.123 gr. atom) of magnesium metal and 31.7 ml (0.543 mole) of e of was added into the three-necked flask at 75° C. for 9 times with the interval time of 10 minutes. After the completion of the reaction, the resultant product was washed 3 times with 100 ml of n-heptane for each wash at room temperature. The washed product is dried under vacuum to obtain magnesium compound in powder form.

Preparation of solid pre-catalyst was the same as in Example 1.

COMPARATIVE EXAMPLE 2 (Com. Ex. 2)

(1) Preparation of Magnesium Compound

A three-necked flask having an internal volume of 500 ml and having a stirrer was flushed with nitrogen. 31.7 ml (0.543 mole) of e of and 0.68 g (0.0054 gram atom) of iodine was added into the three-necked flask and maintained at a contact temperature at 75° C. and 180 rpm for 10 minutes. Before the first addition of magnesium metal for 10 min, 5 mol % of 2-methoxy ethanol based on the number of moles of Magnesium was introduced, and then 3 g (0.123 g atom) of magnesium metal and 31.7 ml (0.543 mol) of ethanol were added. After the completion of the reaction, the resultant product was washed 3 times with 100 ml of n-heptane for each wash at room temperature. The washed product is dried under vacuum to obtain magnesium compound in powder form.

Preparation of solid pre-catalyst was the same in Example 1.

EXAMPLE 2 (Ex.2)

The preparation of magnesium compound was the same as in Example 1 except that the modifier was 10 mol % based on the number of moles of Magnesium of 2-methoxyethanol.

EXAMPLE 3 (Ex.3)

The preparation of magnesium compound was the same as in Example 1 except that the modifier was 10 mol % based on the number of moles of Magnesium of 2-butoxyethanol.

As it can be taken from Table 1, the magnesium alkoxide from the inventive method (MGE_Ex.1) shows the narrow particle size distribution (lower RSF) and higher circularity than the magnesium alkoxide ob ed by adding 2-methoxy-ethanol at the first step (MGE_Com.Ex.2). Furthermore, a lot of magnesium metals which refer to incomplete reaction are found in Com. Ex.2 whereas our inventive method (Ex.1) shows no magnesium metal remaining. The catalyst produced by the inventive magnesium alkoxide (Cat-MGE_Ex.1) provides higher activity than the catalyst produced by the magnesium alkoxide without adding modifier (Cat_MGE_Com.Ex.1). In addition, the inventive magnesium alkoxide (MGE_Ex.1) has higher bulk density than the conventional method (MGE_Com.Ex.1). As the test results, our inventive method of adding modifier after the reacting step of magnesium metal and alcohol show the advantage over the conventional methods. Furthermore, Ex. 2 and Ex. 3 show that higher catalyst activity obtained when increasing amount of modifier and number of carbon atoms of the modifier.

Figure 2:
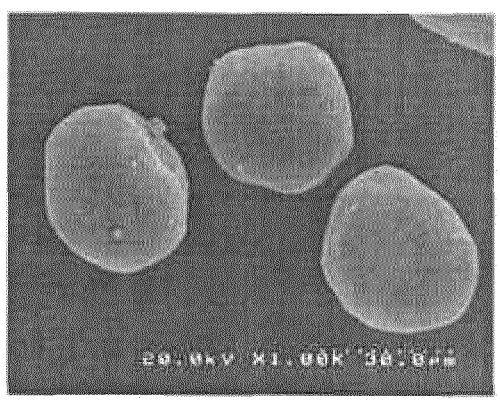
FIG. 2 is a SEM image of the inventive magnesium alkoxide according to Ex.3.
Figure 3:
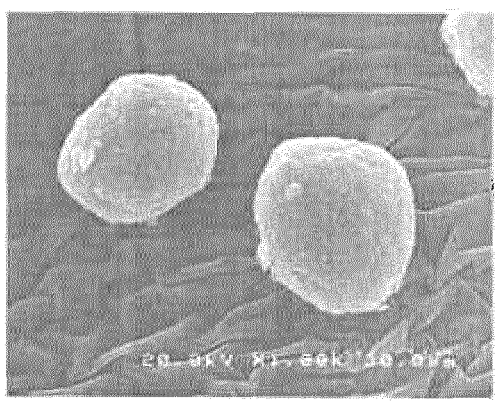
FIG. 3 is a SEM image of the conventional magnesium alkoxide according to Com.Ex.1

FIGS. 2 and 3 show that the surface of magnesium alkoxide from the inventive method (MGE_Ex.3) has smoother surface than the magnesium alkoxide from the conventional method (MGE_Com. Ex. 1).

TABLE 1

Properties of magnesium compound and solid pre-catalyst

| Example | | Appearance | D10 (micron) | D50 (micron) | D90 (micron) | RSF | Circularity | Bulk density (g/ml) | Activity (kg – PP/g – cat · h · atm) |
|---|---|---|---|---|---|---|---|---|---|
| Ex. 1 | MGE | Spheroidal shape Plate-like crystal building unit | 29.8 | 34.8 | 40 | 0.29 | 0.91 | 0.39 | — |
| | Cat_MGE | Spheroidal shape Smooth surface | 29.7 | 34.7 | 40 | 0.30 | 0.90 | — | 0.180 |
| Com. Ex. 1 | MGE | Spheroidal shape Plate-like crystal building unit | 32.4 | 37.5 | 42.6 | 0.27 | 0.91 | 0.30 | — |
| | Cat_MGE | Spheroidal shape Smooth surface | 34.5 | 39.7 | 46.6 | 0.30 | 0.87 | — | 0.154 |
| Com. Ex. 2 | MGE | Spheroidal shape Lots of Mg metal remains | 16.7 | 21.7 | 44.9 | 1.30 | 0.75 | 0.36 | — |
| Ex. 2 | MGE | Spheroidal shape Round-like building unit | 26.1 | 31.3 | 36.6 | 0.34 | 0.88 | 0.42 | — |
| | Cat_MGE | Spheroidal shape Smooth surface | 29.3 | 34.5 | 40.5 | 0.33 | 0.88 | — | 0.240 |
| Ex. 3 | MGE | Spheroidal shape Smooth surface | 32.9 | 37.9 | 43.4 | 0.28 | 0.91 | 0.41 | — |
| | Cat_MGE | Spheroidal shape Smooth surface | 31.0 | 35.7 | 42.5 | 0.32 | 0.90 | — | 0.244 |

Further magnesium compouds in accordance with the invention and solid pre-catalysts comprising the same have been synthesized following the general procedure of example 1 above with the only exception that other modifiers have been used. The results are summarized table 2 below.

| Modifier | D50 (micron) | Circularity | Bulk density (g/ml) |
|---|---|---|---|
| Methanol | 36.4 | 0.90 | 0.35 |
| 1-butanol | 37.7 | 0.89 | 0.35 |
| 1-decanol | 37.4 | 0.91 | 0.36 |
| Ethylene glycol | 28.3 | 0.88 | 0.38 |
| 1-propanol | 36.8 | 0.90 | 0.35 |
| 2-propanol | 35.4 | 0.90 | 0.35 |
| iso-butanol | 36.5 | 0.91 | 0.35 |
| 2-butanol | 37.2 | 0.90 | 0.34 |
| tert-butanol | 37.2 | 0.90 | 0.36 |
| 2-butanone | 37.3 | 0.89 | 0.34 |
| Ethyl acetate | 36.3 | 0.90 | 0.36 |
| Toluene | 35.2 | 0.90 | 0.35 |
| Heptane | 36.1 | 0.91 | 0.35 |
| Phenol | 31.5 | 0.89 | 0.38 |

The features disclosed in the foregoing description and in the claims may, both separately and in any combination, be material for realizing the invention in diverse forms thereof.

The invention claimed is:

1. A method of producing a magnesium compound represented by the following formula:

$$Mg(OR^1)_{2-n}(Modifier)_n$$

wherein $R^1$ is $C_mH_{2m+1}$, wherein m is an integer from 2 to 10, and n is 0-2 wherein the method comprises the steps a) providing a mixture comprising magnesium, an initiator and a first alcohol wherein the molar ratio of initiator to magnesium is from 0.0001 to 1; and b) adding a modifier to the mixture obtained in step a) wherein the modifier is selected from the group consisting of 1-propanol, iso-butanol, tert-butanol, 1-butanol, 2-propanol, 2-butnaol, 1-decanol, phenol, 2-methoxyethanol, 2-ethoxyethanol, 1-methoxy-2-propanol, 2-butoxyethanol, 2-phenoxyethanol, 3-methoxy-1-butanol, 2-butanone, ethylacetate, toluene, heptane, and mixtures thereof, wherein the modifier is different from the first alcohol, wherein, in step b), the modifier is added to the mixture 10-30 minutes after a last portion of magnesium is added to provide the mixture in step a).

2. The method of claim 1, wherein the initiator is a halogen or a halogen containing compound.

3. The method of claim 1, wherein the step a) comprises adding the magnesium and/or first alcohol to a reaction mixture comprising the initiator and first alcohol portionwise.

4. The method of claim 3, wherein the modifier is added after addition of the first portion of the magnesium and/or the first alcohol.

5. The method according to claim 3, wherein the modifier is added after addition of the last portion of the magnesium metal and/or the first alcohol.

6. The method of claim 1, wherein the modifier has relative polarity in a range of 0.0001 to 0.770.

7. The method of claim 1, the modifier comprises from 3 to 10 carbon atoms in total.

8. The method of claim 1, wherein the first alcohol is ethanol.

9. A magnesium compound obtained by the method of claim 1.

10. The magnesium compound according to claim 9, wherein the magnesium compound has an average particle size ($D_{50}$) in a range of 25-65 micron, a circularity in a range of 0.73-0.91 and a bulk density in a range of 0.30-0.45 g/ml.

11. A solid pre-catalyst for olefin polymerization comprising a) the magnesium compound according to claim 9, b) a titanium compound represented by the following formula:

$$Ti(OR^3)_pX_{4-p}$$

wherein each $R^3$ is the same or different and is hydrocarbyl group having from 1 to 10 carbon atoms, X is a halogen atom, and p is an integer from 0 to 4; and c) an electron donating compound.

12. A catalyst system for olefin polymerization comprising
   a) the solid pre-catalyst according to claim 11;
   b) an organoaluminum compound; and
   c) optionally, an electron donating compound.

13. A process for preparing polypropylene homopolymer or a polypropylene copolymer comprising contacting the catalyst system according to claim 12 with propylene monomers.

14. A magnesium compound represented by the following formula:

$$Mg(OR^1)_{2-n}(\text{Modifier})_n$$

where
$R^1$ is $C_mH_{2m+1}$, where m is an integer of from 2 to 10;
n is from 0.01-2; and
Modifier is selected from the group consisting of 1-propanol, iso-butanol, tert-butanol, 1-butanol, 2-propanol, 2-butanol, 1-decanol, phenol, 2-methoxyethanol, 2-ethoxyethanol, 1-methoxy-2-propanol, 2-butoxyethanol, 2-phenoxyethanol, 3-methoxy-1-butanol, 2-butanone, ethylacetate, toluene, heptane, and mixtures thereof, wherein Modifier is different from an alcohol having the formula $HOR^1$.

15. The method of claim 2, wherein the initiator is a halogen.

16. The method of claim 15, wherein the halogen is $I_2$.

* * * * *